United States Patent
Huang

(10) Patent No.: US 11,415,714 B2
(45) Date of Patent: Aug. 16, 2022

(54) RADIATION DETECTION DEVICE

(71) Applicant: InnoLux Corporation, Miao-Li County (TW)

(72) Inventor: Tien-Sheng Huang, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 437 days.

(21) Appl. No.: 16/742,923

(22) Filed: Jan. 15, 2020

(65) Prior Publication Data

US 2020/0241154 A1    Jul. 30, 2020

(30) Foreign Application Priority Data

Jan. 30, 2019    (CN) .......................... 201910092624.3

(51) Int. Cl.
*G01T 1/208*    (2006.01)
*G01T 1/20*    (2006.01)

(52) U.S. Cl.
CPC ............ *G01T 1/208* (2013.01); *G01T 1/2018* (2013.01)

(58) Field of Classification Search
CPC ....... G01T 1/208; G01T 1/2018; H04N 5/374; H04N 5/32; A61B 6/44; A61B 6/542
See application file for complete search history.

(56) References Cited

U.S. PATENT DOCUMENTS

2014/0346367 A1\* 11/2014 Shikino ..................... G01T 1/17
                                                                    250/394

FOREIGN PATENT DOCUMENTS

CN    104427937 A  *  3/2015 ............. A61B 6/542
CN    104427937 A     3/2015

OTHER PUBLICATIONS

Translation of CN 104427937 A (Year: 2013).*

\* cited by examiner

*Primary Examiner* — David P Porta
*Assistant Examiner* — Mamadou Faye
(74) *Attorney, Agent, or Firm* — Winston Hsu

(57) ABSTRACT

A radiation detection device includes a driving device used to generate an output signal according to a source signal. The source signal includes a rising duration corresponding to a first pulse and a second pulse of the output signal. The first pulse has a pulse width greater than the second pulse.

20 Claims, 8 Drawing Sheets

RADIATION DETECTION DEVICE

CROSS REFERENCE TO RELATED APPLICATION

This non-provisional application claims priority of China patent application No. 201910092624.3, filed on 30 Jan. 2019, included herein by reference in its entirety.

BACKGROUND OF THE DISCLOSURE

1. Field of the Disclosure

The disclosure relates to a radiation detection device, and specifically, to a radiation detection device for performing automatic exposure detection.

2. Description of the Prior Art

Automatic exposure detection is a technology in which a flat panel detector (FPD) may automatically detect radiation for imaging without using any communication between the FPD and a radiation emitter. Presently, most automatic exposure detection technologies use external sensors to sense radiation. The disadvantage of using an external sensor is that since the quantity of the sensors is limited, the radiation emitter has to emit radiation to where the external sensor is positioned for exposure, otherwise the FPD will not be able to sense the radiation and generate an image successfully. If the FPD is unable to sense the radiation and generate an image successfully, the patient must be re-photographed again, and that will increase a medical risk.

Further, the FPD contains a thin-film transistor panel including photodiodes therein. Typically, a synchronization between the external sensor and the thin-film transistor panel via a processor is required, but the synchronization may have a delay issue. If the FPD is discharging the photodiodes while the radiation emitter emits the radiation, the radiation dose will be wasted and the image quality will also be affected. In such a situation, the patient may be re-photographed again, that will also increase the medical risk.

Therefore, a radiation detection device integrated into the FPD for improving the image quality, and performing automatic exposure without re-photographing a patient to reduce the medical risk.

SUMMARY OF THE DISCLOSURE

In one embodiment, a radiation detection device includes a driving device used to generate an output signal according to a source signal. The source signal includes a rising duration corresponding to a first pulse and a second pulse of the output signal. The first pulse has a pulse width which is greater than a pulse width of the second pulse.

These and other objectives of the present disclosure will no doubt become obvious to those of ordinary skill in the art after reading the following detailed description of the embodiment that is illustrated in the various figures and drawings.

DETAILED DESCRIPTION

Components described as coupled may be directly coupled or indirectly coupled. Two components described as directly coupled refers to the two components are connected to each other, and two components described as indirectly coupled refers to the two are coupled via one or more intermediate components.

When an ordinal number such as "first", "second" and so on is used as an adjective before a term in the specification and claims, that ordinal number is used merely to indicate a particular feature, such as to distinguish that particular feature from another feature that is described by the same term or by a similar term. In addition, the ordinal numbers before terms does not define a numerical limit or an order limit to the terms or manufacturing methods for producing the same.

Figure 1:
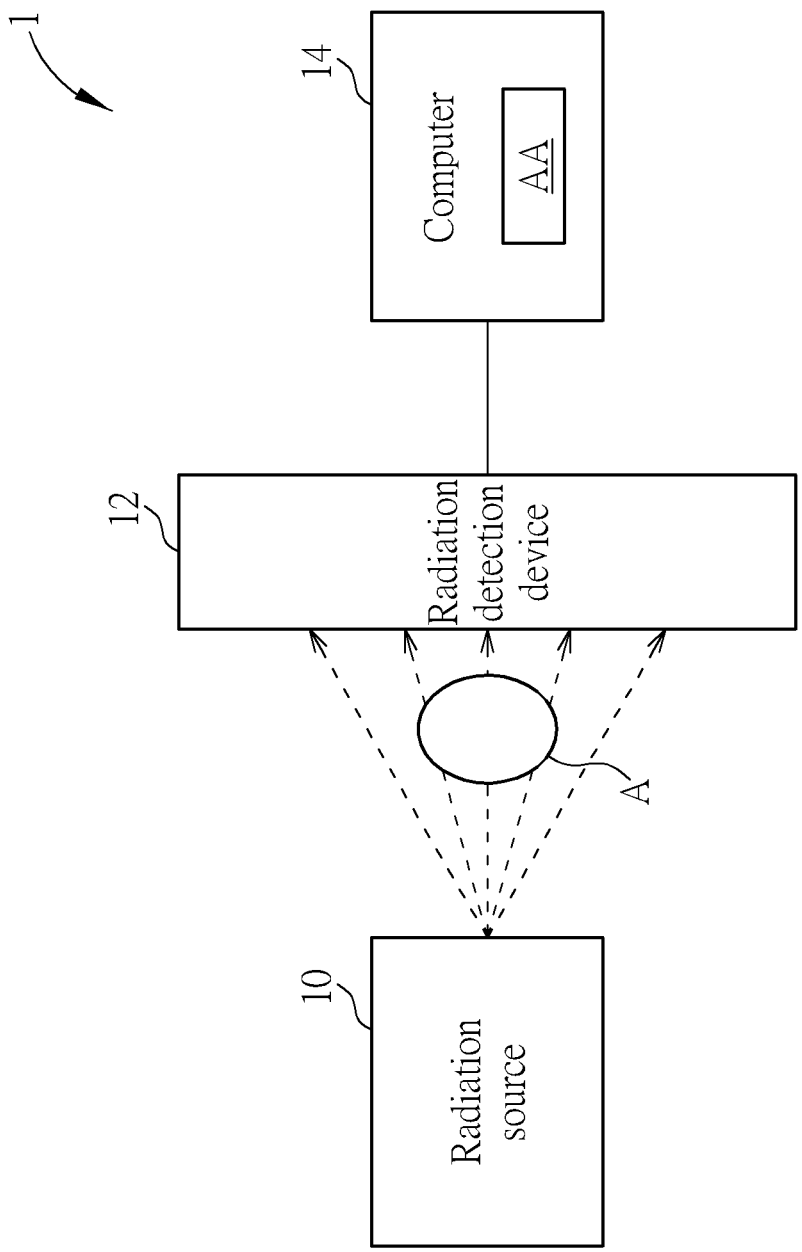
FIG. 1 is a schematic diagram of a radiation system according to an embodiment of the disclosure.

FIG. 1 is a schematic diagram of a radiation system 1 according to an embodiment of the disclosure. The radiation system 1 includes a radiation source 10, a radiation detection device 12 and a computer 14. The radiation detection device 12 is coupled to the computer 14. When an object A is positioned between the radiation source 10 and the radiation detection device 12, the radiation source 10 may emit radiation and the radiation detection device 12 may receive an optical signal. The optical signal may be, but is not limited to, radiation such as X-rays, $\alpha$ radiation, $\beta$ radiation, $\gamma$ radiation. The radiation detection device 12 has an automatic exposure detection function. Upon automatically detecting and determining radiation, the radiation detection device 12 may acquire image data and transmit the same to the computer 14, and the computer 14 may further process the image data to generate an image AA. The image data will be an electrical signal which converted by the radiation detection device 12 when the radiation detection device 12 receives the optical signal passing through the object A.

Figure 2:
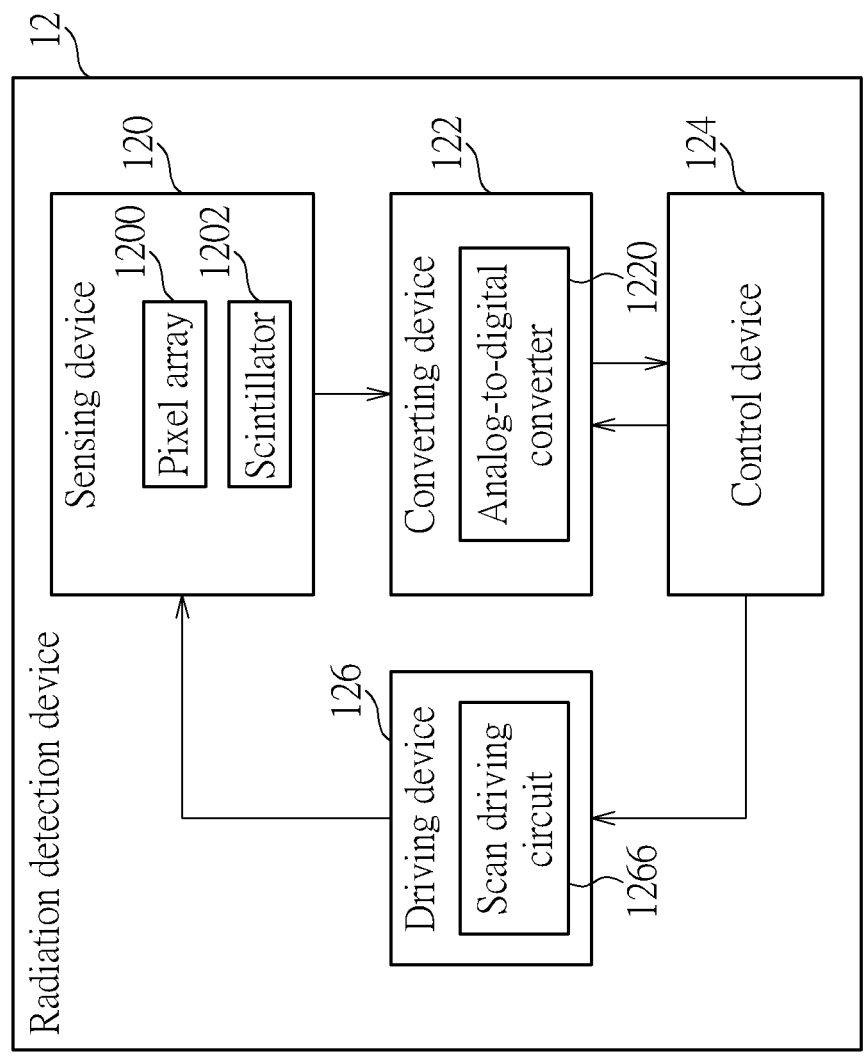
FIG. 2 is a block diagram of the radiation detection device in FIG. 1.

FIG. 2 is a block diagram of the radiation detection device 12 in FIG. 1. The radiation detection device 12 comprises a sensing device 120, a converting device 122, a control device 124 and a driving device 126. The sensing device 120, the converting device 122, the control device 124 and the driving device 126 are sequentially coupled. The sensing device 120 may receive the optical signal, convert the optical signal into electrical charges, and store the electrical charges therein. The control device 124 may control the converting device 122 to convert the electrical charges into a source signal for sampling. Further, the control device 124 may control the driving device 126 to generate an output signal for scanning the sensing device 120.

Figure 3:
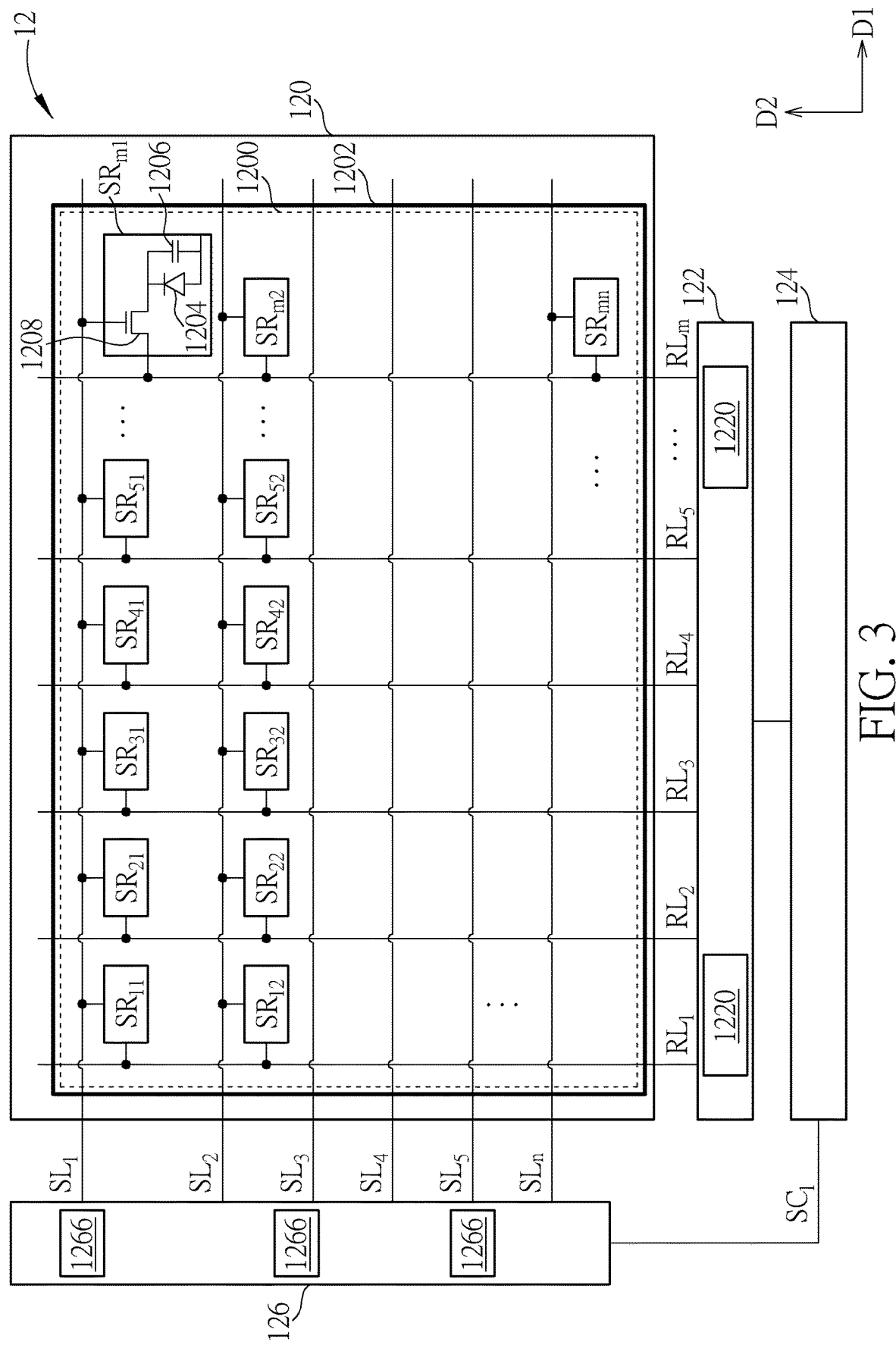
FIG. 3 is a schematic diagram of the radiation detection device in FIG. 2.
Figure 4:
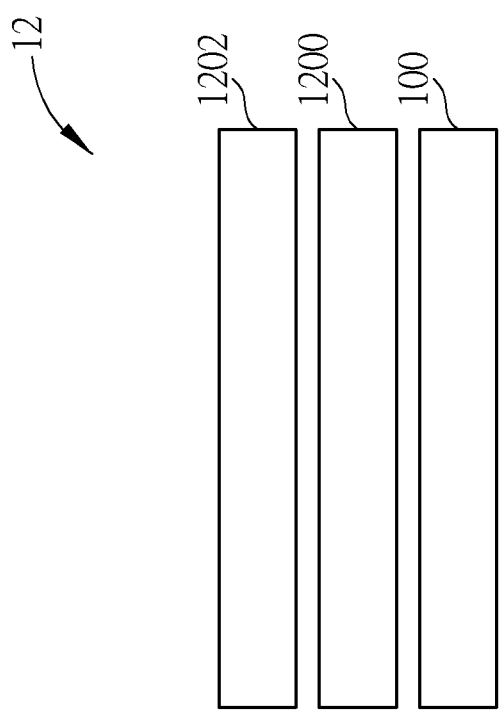
FIG. 4 is a schematic diagram of stacked parts of the radiation detection device in FIG. 2.

FIG. 3 is a schematic diagram of the radiation detection device 12 in FIG. 2. FIG. 4 is a schematic diagram of parts of the structure of the radiation detection device 12. The sensing device 120 comprises a pixel array 1200 and a scintillator 1202. The pixel array 1200 comprises a plurality of pixels $SR_{11}$ to $SR_{mn}$, a plurality of scan lines $SL_1$ to $SL_n$ and a plurality of data lines $RL_1$ to $RL_m$. The plurality of pixels $SR_{11}$ to $SR_{mn}$ are arranged in a matrix extending along a direction D1 and a direction D2 which is different from the direction D1. Each of the pixels $SR_{11}$ to $SR_{mn}$ in the pixel array 1200 may selectively include a photodiode 1204, a capacitor 1206 and a transistor 1208. Moreover, at least one of the plurality of scan lines $SL_1$ to $SL_n$ may be coupled to the driving device 126 and some of the pixels $SR_{11}$ to $SR_{mn}$, and at least one of the plurality of data lines $RL_1$ to $RL_m$ may be coupled to the converting device 122 and some of the pixels $SR_{11}$ to $SR_{mn}$. In the embodiment, the scan lines $SL_1$ to $SL_n$ may extend, but is not limited to, along the direction D1, and the data lines $RL_1$ to $RL_m$ may extend, but is not limited to, along the direction D2. In the embodiment, the direction D1 may be, but is not limited to, perpendicular to the direction D2.

As depicted in FIG. 4, the radiation detection device 12 may further comprise a substrate 100. The pixel array 1200 may be disposed on the substrate 100. The substrate 100 may be, but is not limited to, glass, polyimide (PI), polyethylene terephthalate (PET), or other suitable materials. The substrate 100 may be, but is not limited to, in a rectangular shape, an arced shape or an irregular shape. Moreover, the converting device 122, the control device 124 and the driving device 126 may be, but are not limited to, disposed on the substrate 100. The scintillator 1202 may be disposed on the pixel array 1200 and cover at least part of the pixels $SR_{11}$ to $SR_{mn}$. In the embodiment, the scintillator 1202 may be, but not limited to, in the form of a film disposed on the pixel array 1200. In other embodiments, the scintillator 1202 may be adhered on the pixel array 1200. In the embodiment, the scintillator 1202 may not cover the converting device 122 and the control device 124 to minimize the wastage of materials.

In the embodiment, the scintillator 1202 may convert the optical signal into visible light, e.g., converting X-rays into visible light having a wavelength in 495 nm-570 nm, or 400 nm-750 nm. The photodiode 1204 may convert the visible light into electrical charges and store the electrical charges into the corresponding capacitor 1206. The converting device 122 may comprise at least one analog-to-digital converter (ADC) 1220. In the embodiment, the converting device 122 may comprise two analog-to-digital converters 1220 or ten analog-to-digital converters 1220. In other embodiments, the converting device 122 may comprise, but is not limited to, fifteen analog-to-digital converters 1220. The analog-to-digital converters 1220 may be coupled to the capacitors 1206 in the pixels $SR_{11}$ to $SR_{mn}$ via the data lines $RL_1$ to $RL_m$. In the embodiment, the driving device 126 may output an output signal Sout. When the driving device 126, coupled to the control device 124, scans the pixel array 1200 row by row via the scan lines $SL_1$ to $SL_n$, the transistors 1208, being switches, may be turned on one by one, meanwhile, the converting device 122 may sample the corresponding pixels $SR_{11}$ to $SR_{mn}$ to read out the amount of the electrical charges stored in the capacitors 1206 to generate the source signal, and to provide the source signal to the control device 124 to determine whether the radiation has been detected.

Prior to entering a radiation photographic mode T1, the control device 124 may set up parameters for radiation determination (e.g., a determination threshold Vth for determining the presence of X-rays or a feedback capacitor of an analog-to-digital converter), and determine whether the source signal is a noise or a radiation based on the parameters. The control device 124 may be a controller, a microcontroller, a processor, a microprocessor, a field programmable gate array (FPGA), or other computing devices. The driving device 126 may comprise at least one scan driving circuit 1266. Each scan driving circuit 1266 comprises at least one gate driver. The quantity of the gate drivers is not limited in the disclosure.

Figure 5:
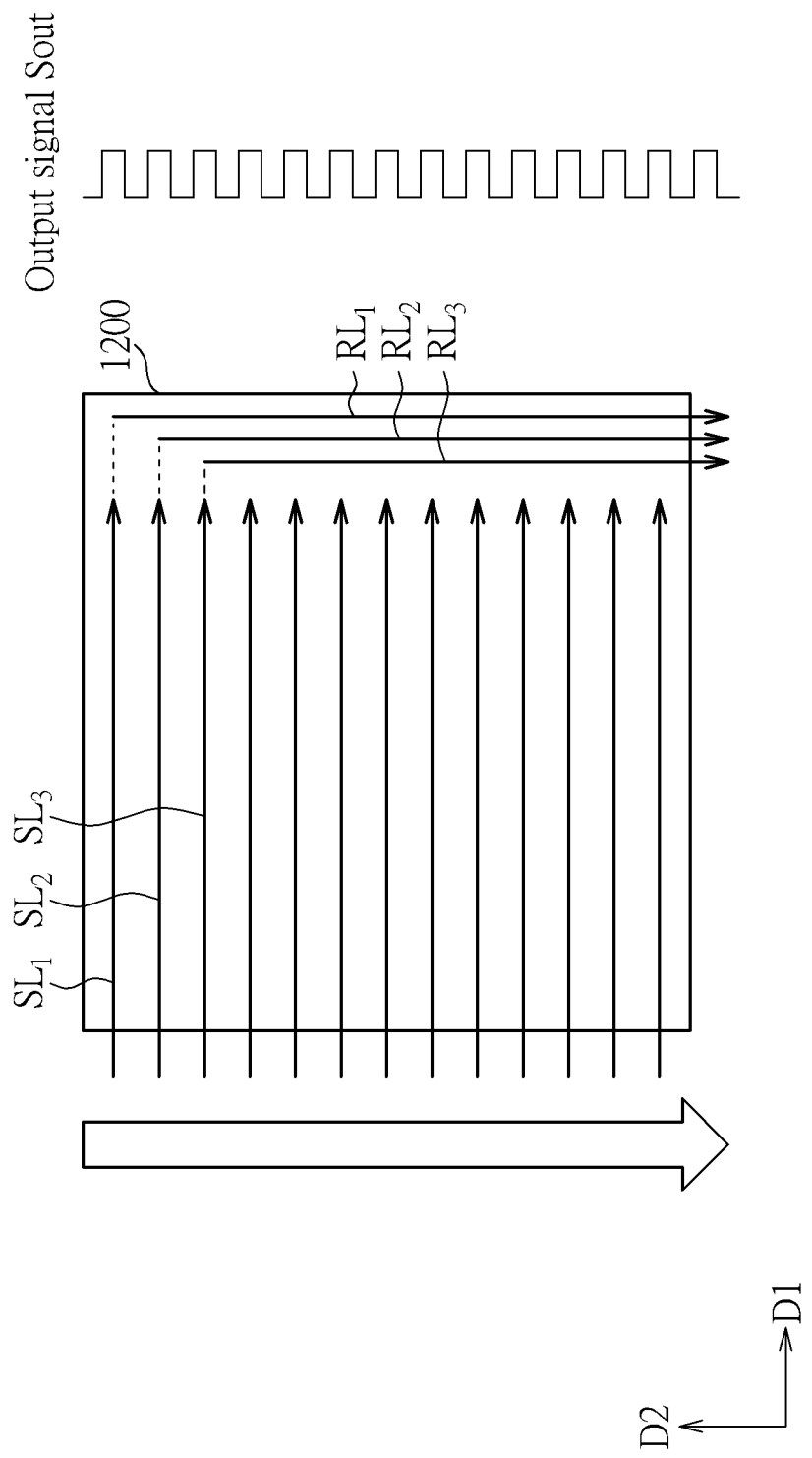
FIG. 5 is a schematic diagram of scanning and sampling the pixel array in the FIG. 3 according to an embodiment of the disclosure.
Figure 6:
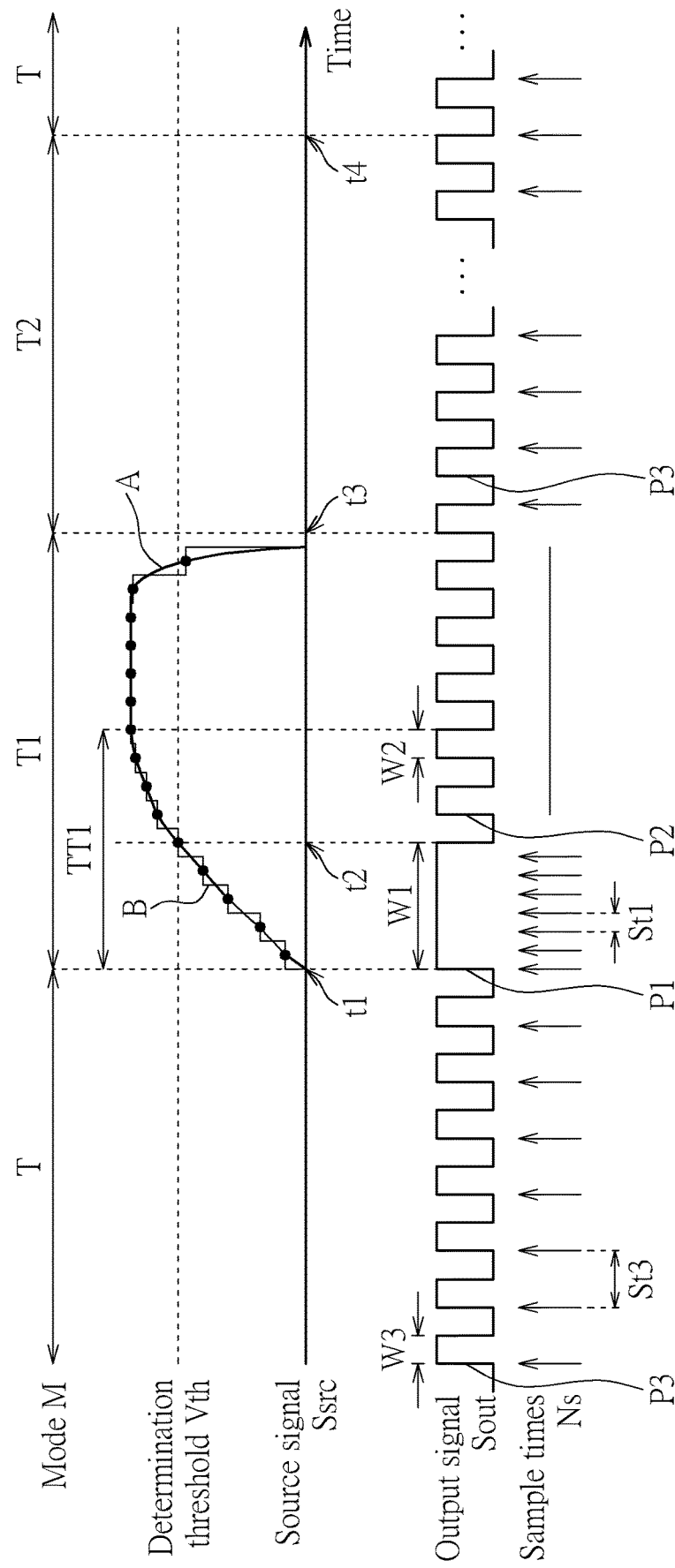
FIG. 6 is a timing diagram for the radiation detection device in FIG. 2.

FIG. 5 is a schematic diagram of scanning and sampling the pixel array 1200 in the FIG. 3 according to an embodiment of the disclosure. FIG. 6 is a timing diagram for the radiation detection device 12 in FIG. 2. When the radiation detection device 12 is in a standby duration T, the driving device 126 may generate an output signal Sout including one or more pulses. Each pulse in the output signal Sout corresponds to a row of pixels in the pixel array 1200. The driving device 126 may scan along the direction D2 and from top to bottom via the scan lines $SL_1$ to $SL_n$. Furthermore, the converting device 122 may sample the same row of pixels via the data lines $RL_1$ to $RL_m$, and receive the electrical charges stored in the capacitors in the same row of pixels, and convert the sampled electrical charges into the source signal Ssrc to provide the same to the control device 124 to determine whether the source signal Ssrc has changed, and the control device 124 may output a control signal Sc1 based on a determination result, and to control the output signal Sout generated by the driving device 126. In the embodiment, the scanning line $SL_1$ for scanning may correspond to, but is not limited to, the data line $RL_1$ for sampling. Any scanning line may be used for scanning, and any data line may be used for sampling. Further, the scanning direction and the sampling direction are not limited to the embodiments in the disclosure.

Referring to FIG. 6, the radiation detection device 12 comprises the source signal Ssrc, the output signal Sout, and sample times Ns. In the standby duration T, the driving device 126 may generate a plurality of third pulses P3 to scan the pixel array 1200 row by row, and the converting device 122 may sample the pixel array 1200 row by row to provide the source signal Ssrc to the control device 124, so as to determine whether the sensing device 120 has received the optical signal. Further, the third pulses P3 in the standby duration T serve to discharge the photodiodes 1204, and all the photodiodes 1204 will be in the same condition and remaining in an initialized state. Upon Time t1, in a rising duration TT1, the source signal Ssrc starts rising gradually, the output signal Sout of the driving device 126 changes from the third pulse P3 to the first pulse P1, wherein the first pulse P1 has a pulse width W1, and the third pulse P3 has a pulse width W3, the pulse width W1 is greater than the pulse width W3. In the embodiment, the pulse width may be the duration in which a pulse is held continuously at the maximum value. In other embodiments, the pulse width may be the duration in which a full width at half maximum of a pulse. In the embodiment, at Time t1, a starting point of the rising duration TT1, the output signal Sout may be switched, but is not limited to, from the third pulse P3 to the first pulse P1. Furthermore, in the embodiment, in the rising duration TT1, the magnitude of the source signal Ssrc at a next measurement point in time is greater than that at a previous measurement point in time. When there is no change between the magnitudes of the source signal Ssrc at the next measurement point in time and at the previous point in time, then the next measurement point in time does not belong to the rising duration TT1. When a difference between the two magnitudes of the source signal Ssrc measured at the previous point in time and the next points in time is within a tolerance range, it is regarded as no change has occurred between the two magnitudes of the source signal Ssrc, e.g., when the absolute difference between the two magnitudes of the source signal Ssrc measured at the previous point in time and the next points in time is less than 10% of the magnitude of the source signal Ssrc at the previous points in time. When the absolute difference is greater than 20 LSB (least significant bit) or 1.22 mV, it is regarded as a change has occurred.

As shown in FIG. 6, each arrow represents one sampling operation, indicating that after the driving device 126 scans a row of pixels, the converting device 122 samples the same row of pixels. Detailed sampling operation has been shown in FIG. 5 and will not be repeated here. Therefore, when the driving device 126 generates the first pulse P1 corresponding to one row in the pixel array 1200, the converting device 122 increases the sample times taken from the row in the pixel array 1200, so as to detect whether the magnitudes of the source signal Ssrc has been continuously increasing. In the embodiment, a quantity of the sample times Ns taken in the pulse width W1 of the first pulse P1 is greater than a quantity of the sample times Ns taken in the pulse width W3 of the third pulse P3. It is worth noting that, during the standby duration T, any sampling and the next sampling taken in the third pulses P3 are separated by a sampling time interval St3; and during the rising duration TT1, any sampling and the next sampling taken in the first pulse P1 are separated by a sampling time interval St1. The sampling time interval St3 and the sampling time interval St1 may be different, and depending on the design requirements. In the embodiment, the sampling time interval St1 is less than the sampling time interval St3. The sampling time intervals St1, St3 may be determined by a time difference between any sampling time and the next sampling time.

When the magnitude of the source signal Ssrc reaches a determination threshold Vth (i.e., a basis for determining whether radiation is present, and may be varied depending on operational criteria) at Time t2, the control device 124 may determine that the sensing device 120 has detected the radiation, and control the driving device 126 to stop outputting the first pulse P1, that is, the pulse width W1 of the first pulse P1 may start from Time t1 and end at Time t2. After Time t2, the magnitudes of the source signal Ssrc is greater than the determination threshold Vth, the output signal Sout of the driving element 126 changes from the first pulse P1 to the second pulse P2, and the converting device 122 stops sampling the pixel array 1200, and the source signal Ssrc is converted into electrical charges to be stored in the capacitor 1206. The second pulse P2 has a pulse width W2, and the pulse width W1 is greater than the pulse width W2. In the embodiment, the pulse width W2 may be equal to the pulse width W3. In other embodiments, the pulse width W2 may be greater than or be less than the pulse width W3.

At Time t3, the radiation exposure is completed, the magnitude of the source signal Ssrc is dropped to almost zero, the output signal Sout of the driving element 126 changes from the second pulse P2 to the third pulse P3, so as to scan each row of pixels $SR_{11}$ to $SR_{mn}$ in the pixel array 1200 sequentially via the scan lines $SL_1$ to $SL_n$, the converting device 122 starts sampling the electrical charges in each capacitor 1206 to generate image data until the last row of the pixels $SR_{1n}$ to $SR_{mn}$ in the pixel array 1200 is reached. That is, at Time t4, the converting device 122 has already completed reading the image data of the last row of the pixels $S_{1n}$ to $SR_{mn}$, the radiation detection device 12 will re-enter a standby duration T, the driving device 126 will continue generating the third pulses P3 to perform scanning and enabling the converting device 122 to perform sampling row by row in the pixel array 1200, so as to provide the sampling results to the control device 124 to determine whether the source signal has changed. A duration from Time t1 to Time t3 is referred to as the photographic mode T1, and a duration from Time t3 to Time t4 is referred to as an image reading mode T2.

It is worth noting that, the source signal Ssrc may be a digital signal or an analog signal, e.g., the line A in FIG. 6 is an analog signal (the unit is voltage), and the line B is a digital signal (the unit is the least significant bit, LSB). In the embodiment, the source signal Ssrc may be, but is not limited to, the digital signal converted by the converting device 122. Furthermore, the converting device 122 may generate different digital signals according to different resolutions, and will be explained in more details later.

Figure 7:
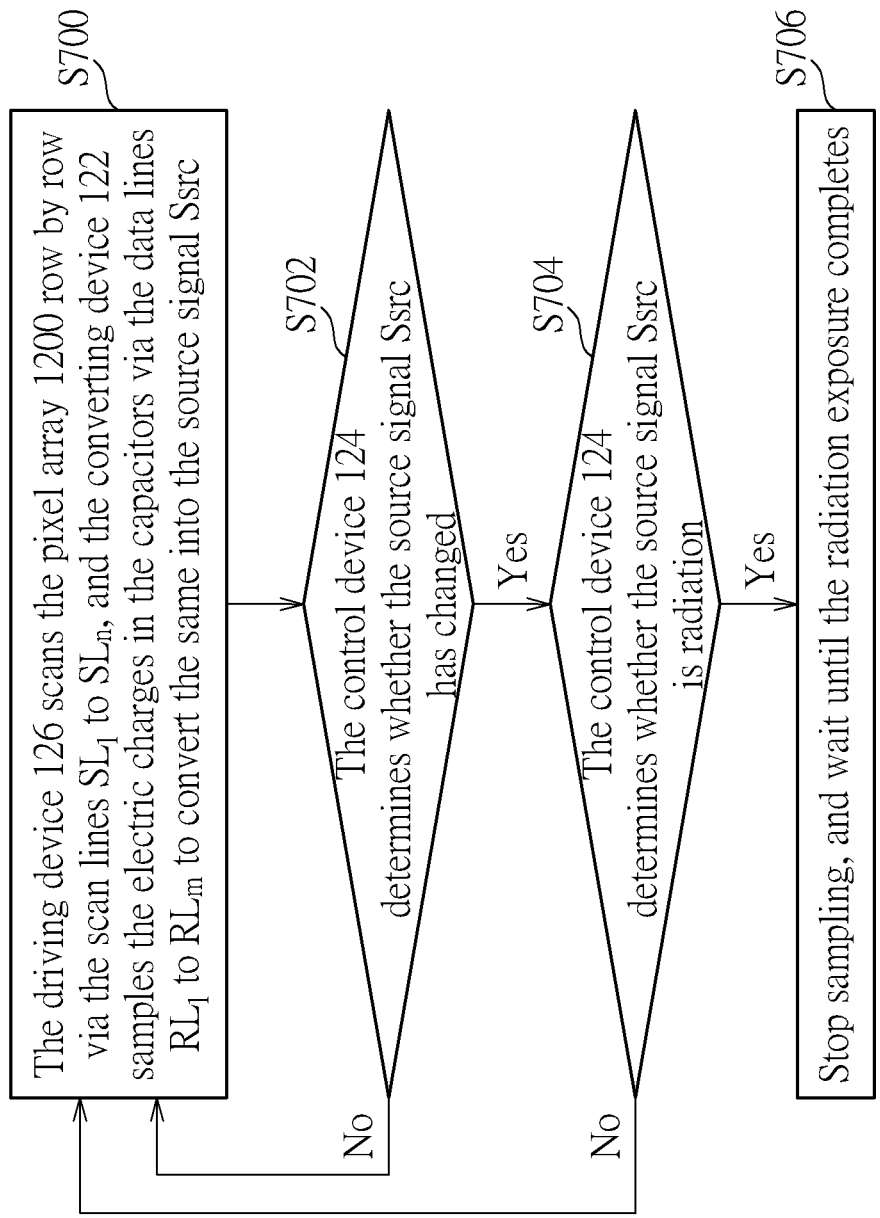
FIG. 7 is a flowchart of an exemplary radiation determination method for use in the radiation detection device in FIG. 1.

FIG. 7 is a flowchart of an exemplary radiation determination method for use in the radiation detection device 12. The radiation determination method comprises Steps S700 to S706. Any reasonable step change or adjustment is within the scope of the disclosure. Steps S700 to S706 are described as below.

Step S700: The driving device 126 scans the pixel array 1200 row by row via the scan lines $SL_1$ to $SL_n$, and the converting device 122 samples the electrical charges stored in the capacitors via the data lines $RL_1$ to $RL_m$ to convert the same into the source signal Ssrc;

Step S702: The control device 124 determines whether the source signal Ssrc has changed; if yes, go to Step S704, and if not, go to Step S700;

Step S704: The control device 124 determines whether the source signal Ssrc is radiation; if yes, go to Step S706, and if not, go to Step S700;

Step S706: Stop sampling, and wait until the radiation exposure completes.

In Step S700, the radiation detection device 12 scans the pixel array 1200 row by row to detect any possible source signal Ssrc. The driving device 126 provides an output signal Sout to scan the pixel array 1200 row by row via the scan lines $SL_1$ to $SL_n$, and the converting device 122 samples the corresponding row in the pixel array 1200 via the data lines $RL_1$ to $RL_m$ to convert the electrical charges stored in the capacitors into the source signal Ssrc, and provides the source signal Ssrc to the control device 124.

In Step S702, the control devise 124 determines whether the source signal Ssrc has changed. If the magnitude of the source signal Ssrc in the next second is greater than that in the previous second, it can be identified that a change has occurred and then Step S704 is executed, regardless of the source signal Ssrc being the digital signal or the analog signal. If no change has occurred, the radiation determination method returns to Step S700 to continue scanning and sampling row by row.

In Step S704, the control device 124 determines whether the source signal Ssrc is radiation. During the rising duration of the magnitudes of the source signal Ssrc, the driving device 126 extends the pulse width of the output signal Sout. In the duration of the extended pulse width of the output signal Sout, the converting device 122 increases the sample times, to provide the sampled results to the control device 124 to determine whether the source signal Ssrc is gradually increasing and is not rapidly increasing, or determine whether the magnitudes of the source signal Ssrc have reached the determination threshold, so as to determine whether the source signal Ssrc is radiation. If yes, the radiation determination method goes to Step S706, and if not, returns to Step S700 to continue scanning and sampling row by row. In the embodiments, whether the source signal Ssrc is gradually increasing may be determined based on a slope or an inclination angle. When the inclination angle approaches 90 degrees, the rapidly increasing source signal Ssrc may be regarded as a noise.

In Step S706, the converting device 122 in the radiation detection device 12 stops sampling, and converts the source signal Ssrc into the electrical charges and stores the electrical charges in the capacitors, the driving device 126 shortens the pulse width of the output signal Sout and waits for the completion of the radiation exposure, i.e., waiting for the magnitudes of the source signal Ssrc to drop to almost zero.

Figure 8:
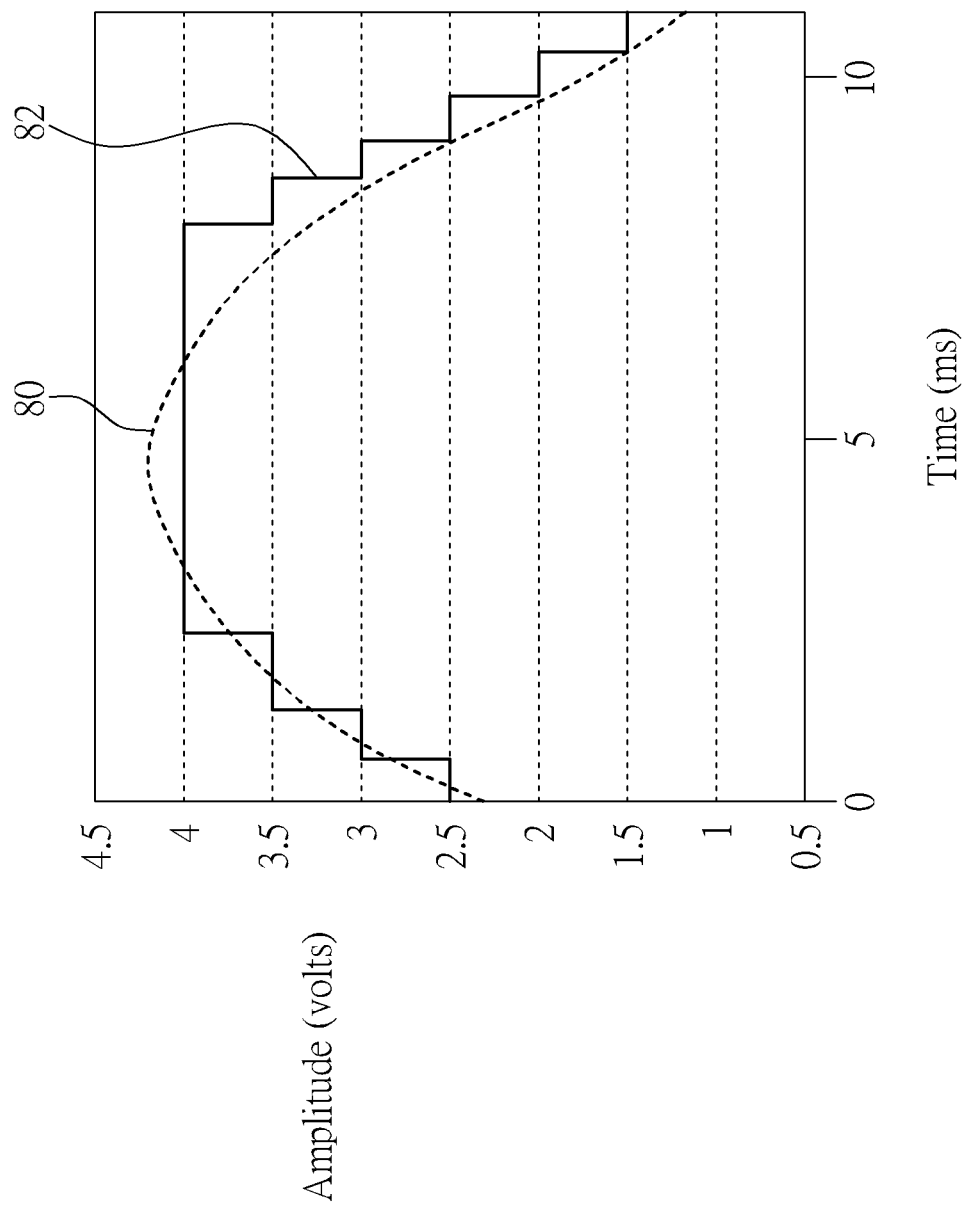
FIG. 8 is a schematic diagram of the converting device converting the source signal according to various resolutions.

FIG. 8 is a schematic diagram of the converting device 122 converting the source signal Ssrc according to various resolutions, where the vertical axis represents amplitude, and the horizontal axis represents time. Upon detecting the source signal Ssrc, if the converting device 122 uses a quantization resolution of 3 bits, the maximum amplitude of the source signal Ssrc may be represented by 8 quantization steps. For example, when the amplitude range is between 0.5V and 4.5V, and the quantization resolution is 3 bits, the amplitude range may be divided by 8 (i.e. 2 to the power of 3) to result in one step size of 0.5V, the source signal Ssrc being represented by the solid line 82 in FIG. 8. If the converting device 122 uses a quantization resolution of 16 bits, the maximum amplitude of the source signal Ssrc may be represented by 65536 quantization steps. For example, when the amplitude range is between 0.5V and 4.5V, and the quantization resolution is 16 bits, the amplitude range may be divided by 65536 (i.e. 2 to the power of 16) to result in one step size of 61 uV, the source signal Ssrc being represented by the dotted line 80 in FIG. 8. In the embodiment, the converting device 122 adopts a 16-bit resolution to generate a source signal Ssrc close to a sinusoidal wave.

The radiation detection devices 12 in FIGS. 2 and 3 determine whether the source signal Ssrc matches radiation, if yes, determine that the source signal Ssrc is radiation and stop sampling, wait for the completion of radiation exposure and then performing sampling to generate image data; and if not, determine that a noise has been identified, and continue scanning and sampling the pixel array 1200. The radiation detection device 12 may support full-range radiation detection, and will not perform exposure at a specific position in the radiation sensing device 12, reducing the medical risks; further, the radiation detection device 12 detects radiation while discharging the photodiodes, reducing risks of resultant image being affected by leakage currents, and reducing a probability of re-photographing a radiation image for a patient. The radiation detection device 12 can detect radiation without using an externally added sensor, and/or providing favorable sensitivity and stability without resulting in X-ray overdose and affecting image quality.

The present invention only uses radiation as an example of the optical signal, but other non-visible light source optical signals that can be converted into electrical signals by a sensing device are also applicable, and are not limited herein. Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A radiation detection device comprising:
a driving device comprising a scan driving circuit, the scan driving circuit comprising a gate driver, the driving device generating an output signal according to a source signal;
wherein the source signal comprises a rising duration corresponding to a first pulse of the output signal and a second pulse of the output signal, and a pulse width of the first pulse is greater than a pulse width of the second pulse.

2. The radiation detection device of claim 1, wherein the first pulse is generated before the second pulse.

3. The radiation detection device of claim 1, further comprising a pixel array, wherein the pixel array comprises a plurality of pixels, a plurality of scan lines and a plurality of data lines, and the driving device is coupled to at least one of the plurality of scan lines and scans any row of the plurality of pixels of the pixel array.

4. The radiation detection device of claim 3, further comprising a converting device, coupled to at least one of the plurality of data lines, and sampling any row of the plurality of pixels of the pixel array.

5. The radiation detection device of claim 4, wherein the converting device stops sampling during the second pulse.

6. The radiation detection device of claim 4, wherein the source signal is a digital signal converted by the converting device.

7. The radiation detection device of claim 3, further comprising a scintillator disposed on the pixel array and converting an optical signal into visible light.

8. The radiation detection device of claim 7, wherein the visible light has a wavelength ranging from 400 nm to 750 nm.

9. The radiation detection device of claim 7, wherein one of the plurality of pixels in the pixel array comprises a transistor, a photodiode and a capacitor, and the photodiode converts the visible light into electrical charges.

10. The radiation detection device of claim 7, wherein the optical signal is X-rays.

11. The radiation detection device of claim 1, further comprising:
a pixel array including a plurality of pixels, a plurality of scan lines and a plurality of data lines; and
a converting device coupled to at least one of the plurality of data lines;
wherein the driving device scans a row of the plurality of pixels of the pixel array and the converting device samples the row of the plurality of pixels of the pixel array.

12. The radiation detection device of claim 1, wherein a quantity of sample times taken in the pulse width of the first pulse is greater than a quantity of sample times taken in the pulse width of the second pulse.

13. The radiation detection device of claim 1, further comprising a control device coupled to the driving device, and determining whether the source signal reaching a determination threshold, and controlling the driving device to stop generating the first pulse in the output signal when the source signal reaching the determination threshold.

14. The radiation detection device of claim 13, wherein the control device further controls the driving device to generate the second pulse in the output signal when the source signal is greater than the determination threshold.

15. The radiation detection device of claim 13, wherein the control device further sets up a value of the determination threshold.

16. The radiation detection device of claim 1, wherein the source signal further comprises a standby duration prior to the rising duration, the standby duration corresponds to a third pulse of the output signal, and a pulse width of the third pulse is less than a pulse width of the first pulse.

17. The radiation detection device of claim 16, wherein the quantity of sample times taken in the pulse width of the first pulse is greater than a quantity of sample times taken in the pulse width of the third pulse.

18. The radiation detection device of claim 16, wherein a sampling time interval during the pulse width of the first pulse is less than a sampling time interval during the pulse width of the third pulse.

19. The radiation detection device of claim 1, wherein the source signal increases in magnitude during the rising duration.

20. The radiation detection device of claim 1, wherein the driving device extends the pulse width of the first pulse during the rising duration.

\* \* \* \* \*